(12) United States Patent
Trichina et al.

(10) Patent No.: US 12,261,935 B2
(45) Date of Patent: *Mar. 25, 2025

(54) PROTECTING POLYNOMIAL HASH FUNCTIONS FROM EXTERNAL MONITORING ATTACKS

(71) Applicant: Cryptography Research, Inc., San Jose, CA (US)

(72) Inventors: Elena Trichina, Aix-en-Provence (FR); Guilherme Ozari de Almeida, Nootdorp (NL); Elke De Mulder, Kirkland, WA (US)

(73) Assignee: Cryptography Research, Inc., San Jose, CA (US)

( * ) Notice: Subject to any disclaimer, the term of this patent is extended or adjusted under 35 U.S.C. 154(b) by 457 days.

This patent is subject to a terminal disclaimer.

(21) Appl. No.: 17/105,247

(22) Filed: Nov. 25, 2020

(65) Prior Publication Data

US 2021/0152331 A1 May 20, 2021

Related U.S. Application Data

(63) Continuation of application No. 15/646,614, filed on Jul. 11, 2017, now Pat. No. 10,855,443.

(60) Provisional application No. 62/437,387, filed on Dec. 21, 2016, provisional application No. 62/368,900, filed on Jul. 29, 2016.

(51) Int. Cl.
*H04L 9/06* (2006.01)
*G09C 1/00* (2006.01)
*H04L 9/32* (2006.01)

(52) U.S. Cl.
CPC .............. *H04L 9/0631* (2013.01); *G09C 1/00* (2013.01); *H04L 9/0637* (2013.01); *H04L 9/0643* (2013.01); *H04L 9/3236* (2013.01); *H04L 2209/046* (2013.01); *H04L 2209/12* (2013.01)

(58) Field of Classification Search
None
See application file for complete search history.

(56) References Cited

U.S. PATENT DOCUMENTS

| 2005/0283714 A1* | 12/2005 | Korkishko | G06F 7/724 714/781 |
| 2008/0130889 A1* | 6/2008 | Qi | H04L 63/0435 380/42 |
| 2009/0080646 A1* | 3/2009 | Yen | H04L 9/3236 708/492 |

(Continued)

*Primary Examiner* — Fatoumata Traore
(74) *Attorney, Agent, or Firm* — Lowenstein Sandler LLP

(57) ABSTRACT

Systems and methods for protecting from external monitoring attacks cryptographic data processing operations involving computation of a universal polynomial hash function, such as GHASH function. An example method may comprise: receiving an input data block, an iteration result value, and a mask value; performing a non-linear operation to produce a masked result value, wherein a first operand of the non-linear operation is represented by a combination of the iteration result value and the input data block, and the second operand of the non-linear operation is represented by a secret hash value, and wherein one of the first operand or the second operand is masked using a mask value; determining, based on the mask value, a mask correction value; and producing a new iteration result value by applying the mask correction value to the masked result value.

20 Claims, 7 Drawing Sheets

(56) References Cited

U.S. PATENT DOCUMENTS

| | | | |
|---|---|---|---|
| 2011/0013769 A1* | 1/2011 | Itoh | H04L 9/003 380/28 |
| 2011/0228928 A1* | 9/2011 | Trichina | H04L 9/003 380/28 |
| 2011/0311048 A1 | 12/2011 | Nagata et al. | |
| 2012/0314857 A1 | 12/2012 | Minematsu | |
| 2014/0006753 A1* | 1/2014 | Gopal | H04L 9/0643 712/221 |
| 2014/0211937 A1 | 7/2014 | Coric et al. | |
| 2015/0172042 A1* | 6/2015 | Karroumi | H04L 9/0625 380/28 |

\* cited by examiner

PROTECTING POLYNOMIAL HASH FUNCTIONS FROM EXTERNAL MONITORING ATTACKS

RELATED APPLICATIONS

This application is a continuation of U.S. patent application Ser. No. 15/646,614, filed Jul. 11, 2017, which claims the benefit of U.S. Provisional Application No. 62/368,900 filed Jul. 29, 2016, entitled "Masked GCM Hashing Function" and U.S. Provisional Application No. 62/437,387 filed Dec. 21, 2016, entitled "Protected Polynomial Hash Functions from External Monitoring Attacks." The above-referenced applications are incorporated herein by reference in their respective entireties.

TECHNICAL FIELD

The present disclosure is generally related to computer systems, and is more specifically related to cryptographic data processing systems and methods.

BACKGROUND

Since the advent of computers, constantly evolving have been not only various systems and methods for safeguarding cryptographic keys and/or other sensitive data, but also systems and methods for gaining unauthorized access to the protected data, ranging from conceptually unsophisticated brute force password cracking to complex external monitoring attacks.

BRIEF DESCRIPTION OF THE DRAWINGS

The present disclosure is illustrated by way of examples, and not by way of limitation, and may be more fully understood with references to the following detailed description when considered in connection with the figures, in which.

DETAILED DESCRIPTION

Figure 1:
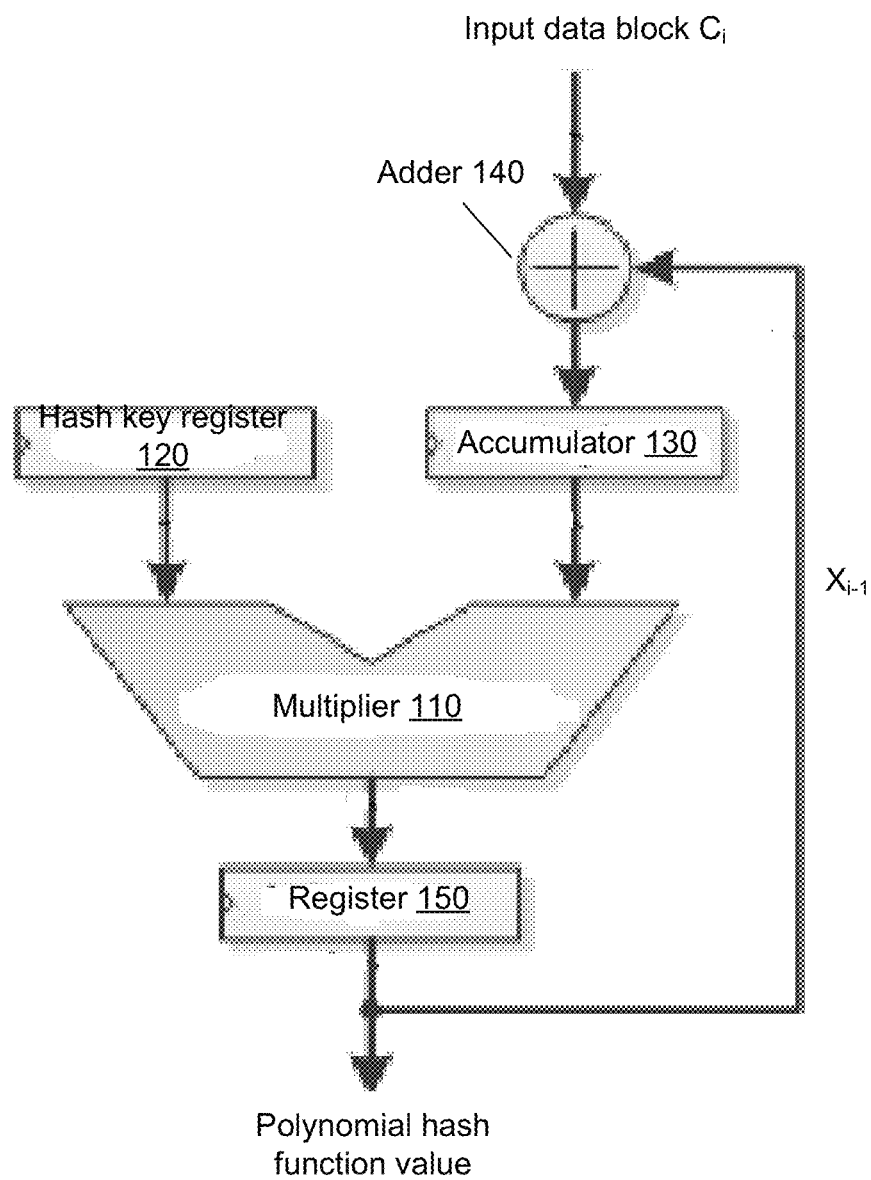
FIG. 1 schematically illustrates an example circuit for computing an unmasked universal polynomial hash function, such as GHASH function, in accordance with one or more aspects of the present disclosure.

Described herein are systems and methods for protecting from external monitoring attacks cryptographic data processing operations involving universal polynomial hash function computation.

"Cryptographic data processing operation" herein shall refer to a data processing operation involving secret parameters (e.g., encryption/decryption operations using secret keys). "Cryptographic data processing device" herein shall refer to a data processing device (e.g., a general purpose or specialized processor, a system-on-chip, a cryptographic hardware accelerator, or the like) configured or employed for performing cryptographic data processing operations.

"External monitoring attack" herein refers to a method of gaining unauthorized access to protected information by deriving one or more protected information items from certain aspects of the physical implementation and/or operation of the target cryptographic data processing device. Side channel attacks are external monitoring attacks that are based on measuring values of one or more physical parameters associated with operations of the target cryptographic data processing device, such as the elapsed time of certain data processing operations, the power consumption by certain circuits, the current flowing through certain circuits, heat or electromagnetic radiation emitted by certain circuits of the target cryptographic data processing device, etc.

Various side channel attacks may be designed to obtain unauthorized access to certain protected information (e.g., encryption keys that are utilized to transform the input plain text into a cipher text) being stored within and/or processed by a target cryptographic system. In an illustrative example, an attacker may exploit interactions of sequential data manipulation operations which are based on certain internal states of the target data processing device. The attacker may apply differential power analysis (DPA) methods to measure the power consumption by certain circuits of a target cryptographic data processing device responsive to varying one or more data inputs of sequential data manipulation operations, and thus determine one or more protected data items (e.g., encryption keys) which act as operands of the data manipulation operations.

Systems and methods of the present disclosure employ various masking schemes for performing certain cryptographic operations in a manner resistant to external monitoring attacks. In an illustrative example, a masking scheme may involve applying a randomly generated integer mask to a value by performing the bitwise exclusive disjunction operation. The result of the single-bit exclusive disjunction is true (binary 1), if and only if one of the two operands is true; otherwise, the result is false (binary 0). Therefore, the result of applying the exclusive disjunction operation to two equal operands is always false. In order to mask a value S, a mask M is applied to it by the exclusive disjunction operation: $S^*=S \oplus M$; to remove the mask, the exclusive disjunction is performed on the masked value and the mask:

$$S=S^* \oplus M=(S \oplus M) \oplus M=S \oplus (M \oplus M)=S \oplus 0=S.$$

However, in more complex scenarios, e.g., in which a masked value is processed by a non-linear operation, the mask correction value (i.e., the value that is employed to remove a previously applied mask) would differ from the mask, as described in more detail herein below.

The present disclosure describes systems and methods for computing, in a manner protected from various side channel attack, values of so-called universal polynomial hash functions that are based on certain polynomial evaluation functions in finite fields. In an illustrative example, a polynomial function may be represented by the following function:

$$g_k(x)=\Sigma_{i=0}{}^i x_i \cdot k^i, x_i, k \in GF(2n),$$

where $GF(2^n)$ refers to a Galois field which may be viewed as a finite set of n-bit integers with addition and multiplication operations defined on the field elements. Each of the operations maps a pair of field elements onto another field element. Multiplication of two elements involves multiplying the polynomials representing the elements and dividing the resulting $2^n$-bit polynomial by the chosen irreducible field polynomial, thus producing an n-bit result. Addition of two elements involves adding the polynomials, which is in $GF(2^n)$ is equivalent to performing the bitwise exclusive disjunction of the two elements.

The systems and methods of the present disclosure may be employed for protecting, from side-channel attacks, implementations of a wide spectrum polynomial hash functions, such as Poly1305 cryptographic message authentication code (MAC) that can be used for verifying the data integrity and authenticity of a message. In particular, the systems and methods of the present disclosure may be employed for protecting implementations of the keyed GHASH function utilized in the Galois Counter Mode of Operation (GCM) method.

Mode of operation herein refers to an algorithm that defines how to repeatedly apply a block cipher single-block operation to transform amounts of data that exceeds the size of a single block. GCM is a block cipher mode of operation that uses universal hashing over a binary Galois field to provide authenticated encryption. GCM has two operations, authenticated encryption and authenticated decryption. The authenticated encryption operation inputs a secret key, an initialization vector, a plaintext, and additional authentication data (AAD) and produces a ciphertext and an authentication tag associated with the ciphertext. The authenticated decryption operation inputs the secret key, the initialization vector, the ciphertext, the AAD, and the authentication tag, and produces either the plaintext or a special symbol FAIL that indicates that the inputs are not authentic.

GCM encryption and decryption operations utilize the GHASH function which is a type of a universal hash function. An example method of computation GHASH values is described herein below with reference to FIG. 1. In particular, computing GHASH involves several multiplication operations in the Galois field.

In certain implementations, multiplication operations may be protected from external monitoring attacks by masking both the multiplier and multiplicand. Such a scheme would involve performing four multiplications in the finite field and would further require a new mask for every masking operation.

The present disclosure improves the efficiency of universal polynomial hash functions (e.g., GHASH) computation by providing masking schemes that fit the iterative structure of the universal polynomial hash functions. Namely, a universal polynomial hash function is computed iteratively over a certain number of blocks of input data such that the partial result of the iterative computations on all the previous blocks of input data is being combined with the new input block of data and then processed again by a non-linear operation, such as a multiplication with a secret hash key. Thus, a non-linear operation, such as field multiplication, receives as one of its operands (typically, a multiplicand) the result of the previous iteration combined with a new data, and as a second operand (typically, a multiplier) the secret hash key. In order to prevent side-channel leakage during execution of the non-linear operation, processed data is randomized (e.g., masked). The method presented in the disclosure is based on randomization of only one of the operands, and carrying the mask correction value (which depends on the initial random mask value) as a new random mask for a new iteration. This method allows reducing the number of total non-linear operations and does not require a new random value for each iteration, thus being much more efficient than conventional masking schemes.

An example method of the present disclosure involves masking the first input data block, and re-using the corresponding mask correction value as the mask in the subsequent iterations of the polynomial hash function computation. Another example method of the present disclosure involves masking the hash key only, as described in more detail herein below. Thus, the systems and methods described herein represent improvements to the functionality of general purpose or specialized computing devices, by enabling performance of cryptographic data processing operations in a manner resistant to external monitoring attacks.

The systems and methods described herein may be implemented by hardware (e.g., general purpose and/or specialized processing devices, and/or other devices and associated circuitry), software (e.g., instructions executable by a processing device), or a combination thereof. Various aspects of the methods and systems are described herein by way of examples, rather than by way of limitation.

In various illustrative examples described herein below, cryptographic data processing devices may be configured or employed for implementing cryptographic operations utilizing GHASH function employed by GCM method. However, the systems and methods described herein for performing cryptographic data processing operations in a manner resistant to external monitoring attacks may be applicable to various other cryptographic data processing devices and methods.

FIG. 1 schematically illustrates an example circuit for computing an unmasked universal polynomial hash function, such as GHASH function, in accordance with one or more aspects of the present disclosure. In the example implementation illustrated by FIG. 1, values of the polynomial hash function are produced by iteratively multiplying, in the finite field, a hash key by data blocks comprising the ciphertext and/or AAD:

$$X_i = (X_{i-1} \oplus C_i) * H = (X_{i-1} * H) \oplus (C_i * H),$$

where $C_i$ denotes the i-th input data block,
$X_i$ denotes the result of the i-th iteration,
H denotes the hash key,
symbol * denotes multiplication operation in the associated finite field, and
symbol $\oplus$ denotes the addition operation in the associated finite field.

For example, in the case of the GHASH function, in the implementation illustrated by FIG. 1, values of the GHASH function are produced by iteratively multiplying, in the $GF(2^{128})$ field, a hash key by data blocks comprising the ciphertext and/or AAD:

$$X_i = (X_{i-1} \oplus C_i) * H = (X_{i-1} * H) \oplus (C_i * H),$$

where $C_i$ denotes the i-th input data block,
$X_i$ denotes the result of the i-th iteration,
H denotes the hash key,
symbol * denotes multiplication operation in the associated Galois field, and
symbol $\oplus$ denotes the exclusive disjunction operation (also referred to as exclusive or, XOR).

As schematically illustrated by FIG. 1, the circuit 100 may include a Galois field multiplier 110 that may be employed to multiply, in the $GF(2^{128})$ field, the contents of the hash key register 120 and accumulator 130. The hash key register 120 may be employed to store the hash key value. The accumulator 130 may be employed to store the result of performing, by the adder 140, the exclusive disjunction operation on the result of the previous iteration $X'_{i-1}$ and the input data block $C_i$ comprising the ciphertext and/or additional authentication data (AAD). The register 150 may be employed to store the iteration result produced by the multiplier 110.

In order to compute a universal polynomial hash function (e.g., an example GHASH function described herein above with reference to FIG. 1) in a manner resistant to external monitoring attacks, methods and systems of the present disclosure utilize various masking schemes. In an illustrative example, a masking scheme employed to protect the example hash function implementation may involve masking the first input data block, and re-using the corresponding mask correction value as the mask in the subsequent iterations. Therefore, the first masked multiplication may be defined as follows:

$X'_1 = (X_0 \oplus M \oplus C_1) * H$, where $X_0$ denotes the initialization value for computing the polynomial hash function, which, for GHASH function is defined to be $0^{128}$, M denotes a random integer value utilized as the mask, and $X'_1$ denotes the masked result of the first iteration.

Due to the distributive property of multiplication over addition (which, in the case of Galois field, corresponds to exclusive disjunction), $$X'_1 = (X_0 \oplus M \oplus C_1) * H = ((X_0 * H) \oplus (C_1 * H)) \oplus (M * H).$$

By definition of the example GHASH function presented herein above, $X_1 = ((X_0 * H) \oplus (C_1 * H))$.

Therefore, $X'_1 = ((X_0 * H) \oplus (C_1 * H)) \oplus (M * H) = X_1 \oplus (M * H)$.

The masked result of the first iteration $X'_1$ is used as the input for the next iteration:

$X'_2 = (X'_1 \oplus C_2) * H$, where $X'_2$ denotes the masked result of the second iteration.

Performing the transformations that are similar to the ones that have been performed in the first iteration, the masked result of the second iteration $X'_2$ may be determined as follows:

$$\begin{aligned} X'_2 &= (X'_1 \oplus C_2) * H = \\ &((X_1 \oplus (M*H)) * H) \oplus (C_2 * H) == (X_1 * H) \oplus (M * H^2) \oplus (C_2 * H) = \\ &((X_1 * H) \oplus (C_2 * H)) \oplus (M * H^2) == X_2 \oplus (M * H^2). \end{aligned}$$

The above definition of the second iteration may be generalized to define the i-th iteration as follows:

$$\begin{aligned} X'_i &= (X'_{i-1} \oplus C_i) * H = (((X_{i-1} \oplus (M * H^{i-1})) \oplus C_i) * H == \\ &((X_{i-1} * H) \oplus (C_i * H)) \oplus (M * H^i) == X_i \oplus (M * H^i), \end{aligned}$$

where $X'_i$ denotes the masked result of the i-th iteration.

The result of the last iteration may be unmasked by performing the exclusive disjunction operation with the mask correction value $MC_k = M*H^k$:

$X_k = X'_k \oplus (M*H^k)$, where k denotes the number of iterations. In an illustrative example, k=m+n+1, where m is the number of input blocks in the AAD and n is the number of ciphertext blocks.

Since the mask correction value $MC_k = M*H^k$ is independent from the input and feedback (i.e. previous iteration result) values, the mask correction value may be computed in parallel with the masked hash function computation if two hardware multipliers are available. Alternatively, the masked hash function and the mask correction value may be computed using a single multiplier, either in an interleaved fashion or sequentially.

Figure 2:
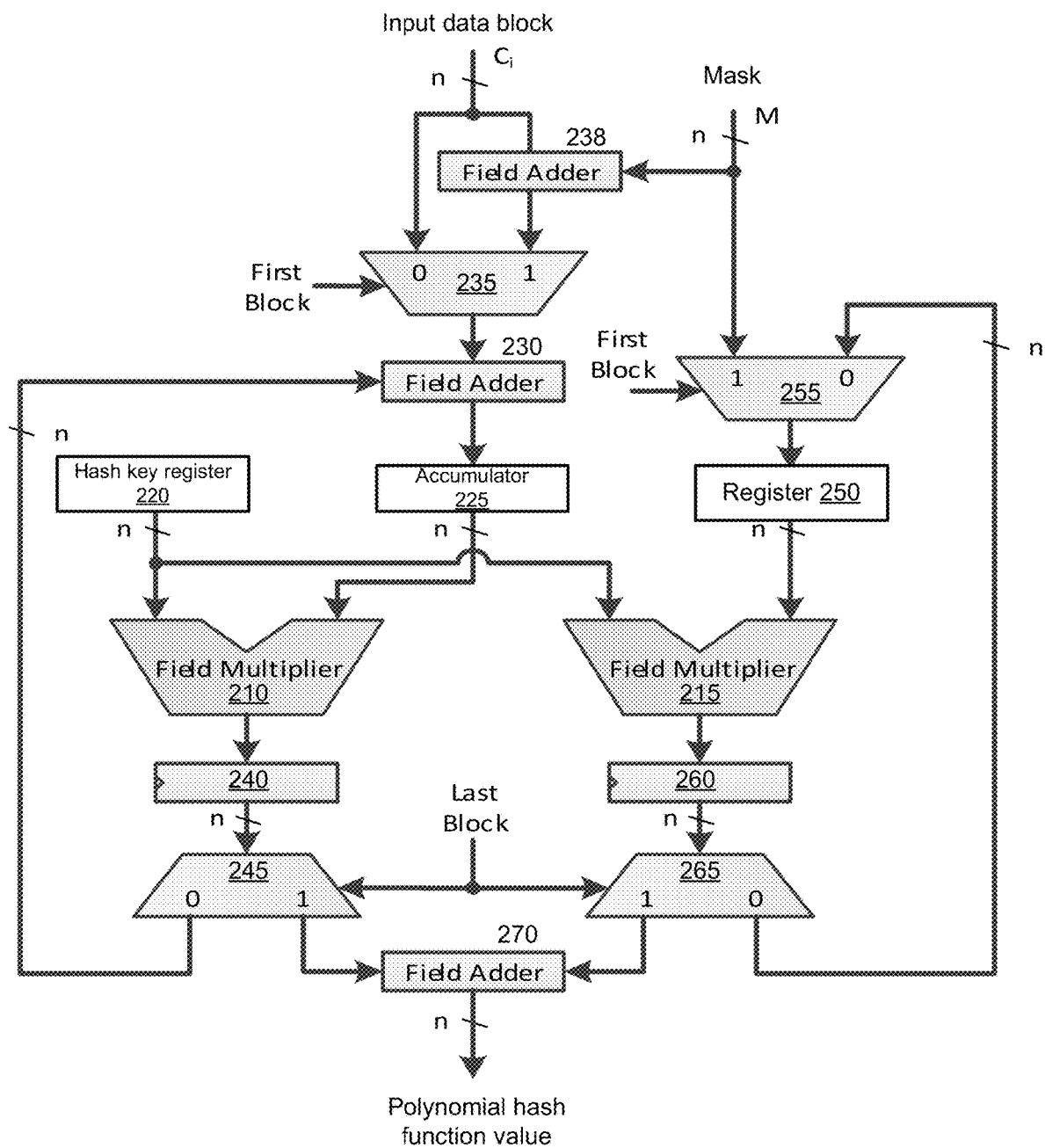
FIG. 2 schematically illustrates an example circuit for computing a universal polynomial hash function, such as GHASH function in a manner resistant to external monitoring attacks, by masking the first input data block, and re-using the corresponding mask correction value as the mask in the subsequent iterations, in accordance with one or more aspects of the present disclosure by iteratively processing the operand bits starting from the first block of the input data, by masking the first input data block, and re-using the corresponding mask correction value as the mask in the subsequent iterations, in accordance with one or more aspects of the present disclosure.

FIG. 2 schematically illustrates an example circuit for computing a universal polynomial hash function, such as GHASH function, in a manner resistant to external monitoring attacks, in accordance with one or more aspects of the present disclosure. The example implementation of FIG. 2 may involve masking the first input data block, and re-using the corresponding mask correction value as the mask in the subsequent iterations, as described in more detail herein above.

As schematically illustrated by FIG. 2, the circuit 200 may include two finite field multipliers 210 and 215, such that the first multiplier 210 may be employed to multiply, in the finite field, for example, in the $GF(2^{128})$ field, the contents of the hash key register 220 and accumulator 225. The hash key register 220 may be employed to store the hash key value. The accumulator 225 may be employed to store the result of performing, by the adder 230, the exclusive disjunction operation on the masked result of the previous iteration and the output of the selector 235. The selector 235 produces the value of $C_1 \oplus M$ that is output by the adder 238 for the first iteration; the selector 235 bypasses the adder 238 to produce the value of $C_i$ for the subsequent iterations. Thus, the first multiplier 210 produces the masked value of $X'_1 = X_1 \oplus (M*H)$ in the first iteration, and the masked value of $X'_i = (X'_{i-1} \oplus C_i) * H$ in each subsequent iteration. The value produced by the first multiplier 210 may be stored in the register 240, which feeds the selector 245.

The second multiplier 215 may be employed to multiply, in the finite field, for example in the $GF(2^{128})$ field, the contents of the hash key register 220 and the mask register 250. The mask register 250 stores the value produced by the selector 255, which is the mask value M in the first iteration and the mask correction value of $MC_i=H*MC_{i-1}$ in each subsequent iteration. Thus, the second multiplier 215 produces the value of H*M in the first iteration, and the mask correction value of $MC_i=H*MC_{i-1}$ in each subsequent iteration, where $MC_i=M*H^i$. The value produced by the second multiplier 215 may be stored in the register 260, which feeds the selector 265.

In all iterations except for the last one, the output of the first multiplier 210 is supplied, by the selector 245, as the input to the adder 230. In the last iteration, the selector 245 supplies the output of the first multiplier 210 to the adder 270. In all iterations except for the last one, the output of the second multiplier 215 is supplied, by the selector 265, as the input to the selector 255. In the last iteration, the selector 265 supplies the output of the second multiplier 215 to the adder 270. The adder 270 performs the unmasking operation after the last iteration, by producing the exclusive disjunction of the outputs of selectors 245 and 265: $X_k=X'k \oplus (M*H^k)$, where k denotes the number of iterations.

Thus, the example circuit 200 computes a universal polynomial hash function, such as the GHASH function, in a manner resistant to external monitoring attacks, by masking the first input data block, and re-using the corresponding mask correction value as the mask in the subsequent iterations.

In another illustrative example, a masking scheme employed to protect the example hash function implementation may involve masking the hash key. Therefore, the masked value produced by the i-th iteration may be defined as follows:

$$X'_i = (X_{i-1} \oplus C_i) * H',$$

where $H'=H \oplus M$ is the masked hash key value.

After each iteration, the mask may be removed by applying the mask correction value $MC_i=(X_{i-1} \oplus C_i)*M$ to the masked iteration result:

$$X_i = ((X_{i-1} \oplus C_i)*(H \oplus M)) \oplus ((X_{i-1} \oplus C_i)*M)$$

Due to the distributive property of multiplication over addition (which corresponds to exclusive disjunction in Galois fields), $$((X_{i-1} \oplus C_i)*(H \oplus M)) \oplus ((X_{i-1} \oplus C_i)*M) = (X_{i-1}C_i)*(H \oplus M \oplus M)$$

Finally, since $M \oplus M = 0$, $(X_{i-1} \oplus C_i)*(H \oplus M \oplus M) = (X_{i-1} \oplus C_i)*H$, thus producing the unmasked result of the i-th iteration.

Therefore, at each iteration two finite field multiplication operations are performed. For example, for GHASH function, two operations in $GF(2^{128})$ are performed. Therefore, the mask correction value may be computed in parallel with the masked iteration result computation if two hardware multipliers are available. Alternatively, the masked iteration result and the mask correction value may be computed using a single multiplier, either in an interleaved fashion or sequentially.

Figure 3:
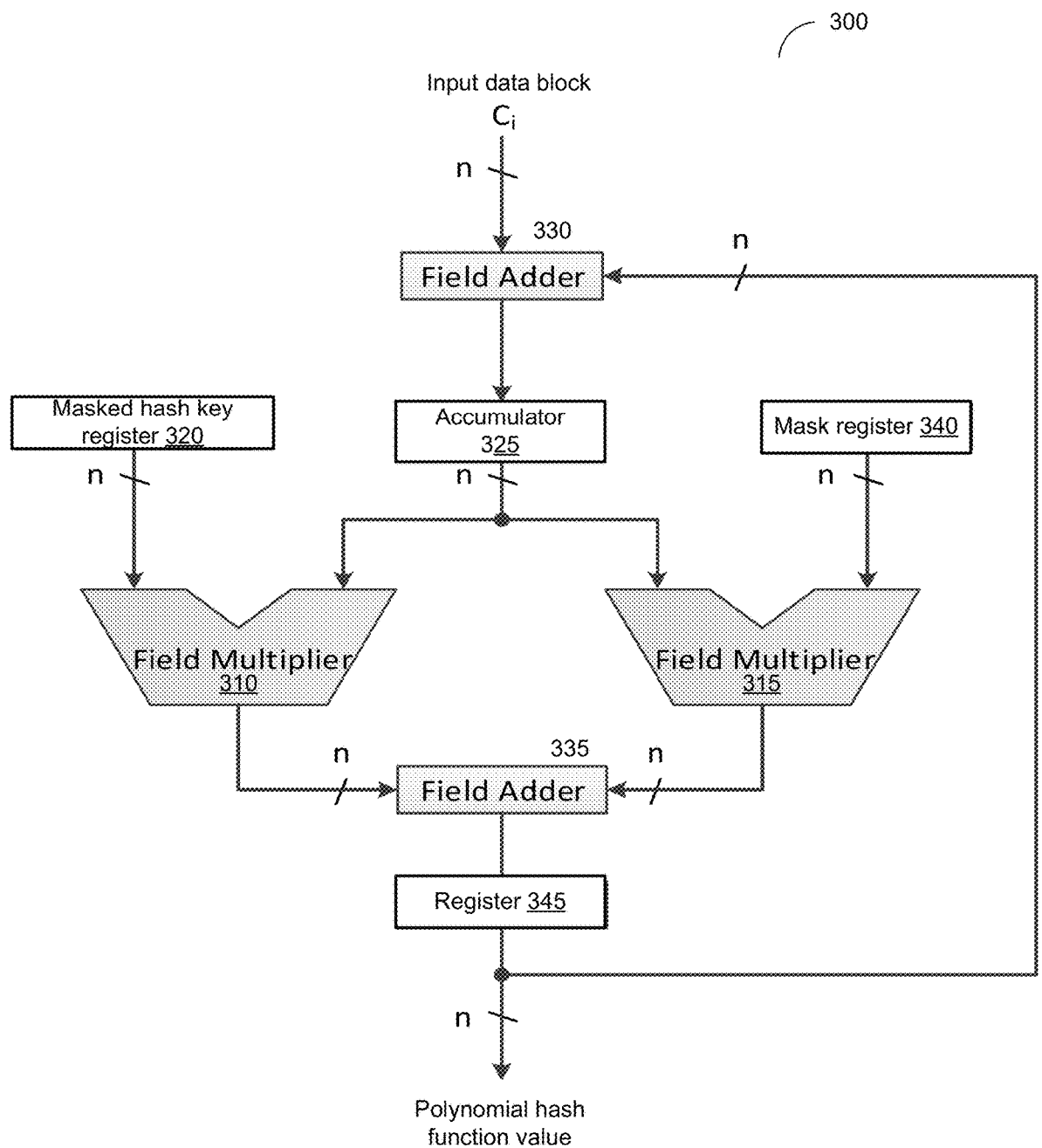
FIG. 3 schematically illustrates another example circuit for computing a universal polynomial hash function, such as GHASH function in a manner resistant to external monitoring attacks, by masking the hash key, in accordance with one or more aspects of the present disclosure, by first masking the hash key and then iteratively processing the operand bits starting from the first block of the input data, performing a field multiplication operation on a given input data block and the masked hash key, computing the mask correction value for the given iteration and performing the mask correction at the end of the operation before processing the next input block of data in accordance with one or more aspects of the present disclosure.

FIG. 3 schematically illustrates an example circuit for computing a universal polynomial hash function, such as a GHASH function in a manner resistant to external monitoring attacks, in accordance with one or more aspects of the present disclosure. The example implementation of FIG. 3 may involve masking the hash key, as described in more detail herein above.

As schematically illustrated by FIG. 3, the circuit 300 may include two finite field multipliers 310 and 315, such that the first multiplier 310 may be employed to multiply, in the finite field, the contents of the masked hash key register 320 and accumulator 325. In the case of the GHASH function, the multipliers 310 and 315 are multipliers in $GF(2^{128})$. The masked hash key register 320 may be employed to store the masked hash key value $H \oplus M$. The accumulator 325 may be employed to store the result of performing, by the adder 330, the addition operation (which is represented by the exclusive disjunction operation in the case of GHASH function) on the result of the previous iteration $X_{i-1}$ and the input block $C_i$ comprising the ciphertext and/or additional authentication data (AAD):

$$Y_i = (X_{i-1} \oplus C_i).$$

The value produced by the first multiplier 310 may be fed to the adder 335.

The second multiplier 315 may be employed to multiply, in the finite field, for example, in the case of the GHASH function, in $GF(2^{128})$ field, the contents of the accumulator 325 and the mask register 340. Thus, the second multiplier 315 produces the mask correction value of $MC_i=(X_{i-1} \oplus C_i)*M$. The mask correction value produced by the second multiplier 315 may be fed to the adder 335.

The adder 335 performs the unmasking operation after each iteration, by producing the sum (which is represented by the exclusive disjunction in the case of GHASH function) of the outputs of the multipliers 310 and 315:
$X_i=((X_{i-1} \oplus C_i)*(H \oplus M)) \oplus ((X_{i-1} \oplus C_i)*M) = (X_{i-1} \oplus C_i)*H$,
thus producing the unmasked result of the i-th iteration, which may be stored in the register 345. In all iterations except for the last one, the value stored by the register 345 may be supplied as the input to the adder 330. Upon completion of the last iteration, the register 345 stores the result value of a universal polynomial hash function, for example, GHASH function value.

Thus, the example circuit 300 computes a universal polynomial hash function, such as the GHASH function in a manner resistant to external monitoring attacks, by masking the hash key and removing the mask by applying the mask correction value to the masked iteration result.

Figure 4:
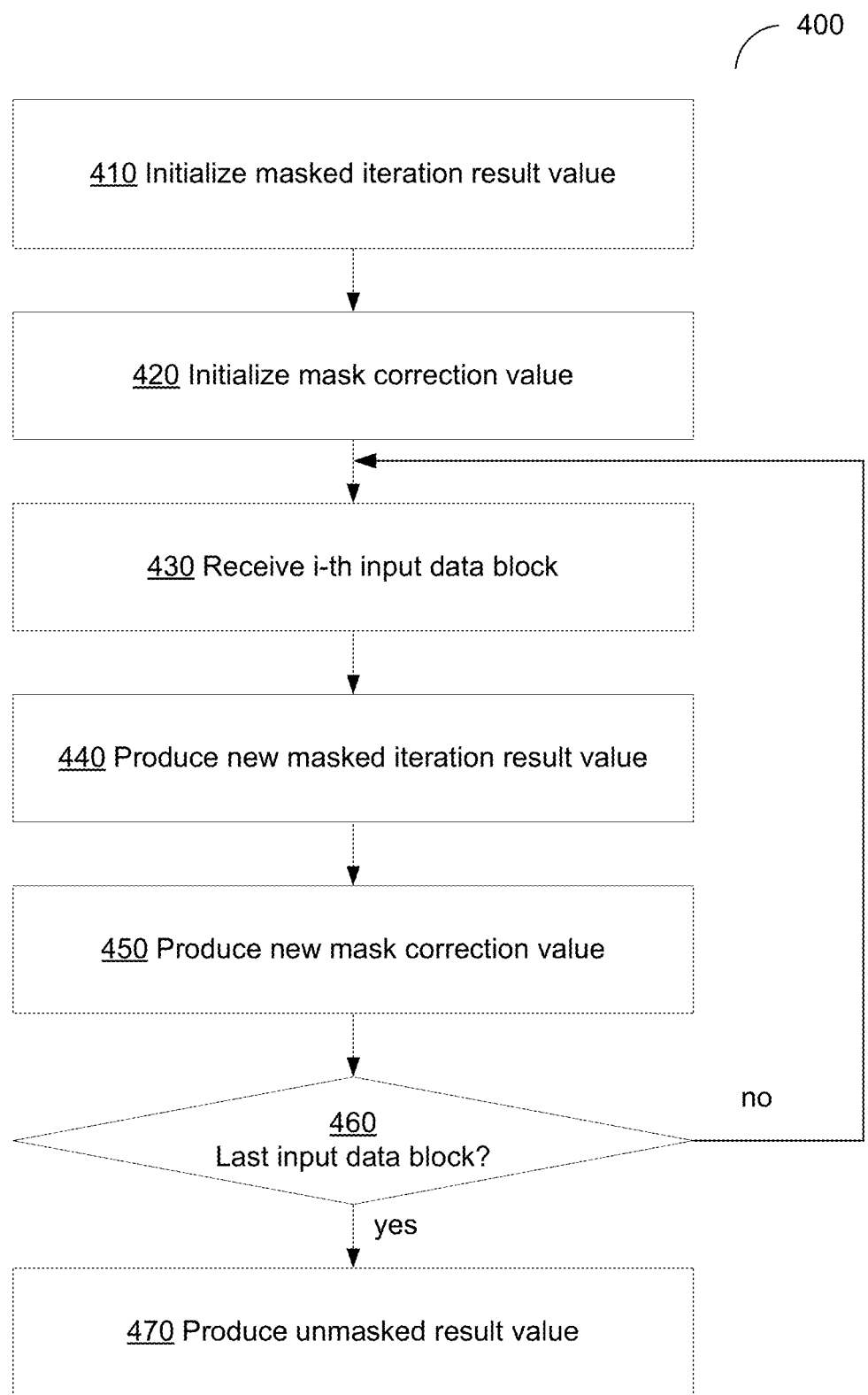
FIG. 4 depicts a flow diagram of an example method for computing the example hash function in a manner resistant to external monitoring attacks, by masking the first input block, and re-using the corresponding mask correction value as the mask in the subsequent iterations, in accordance with one or more aspects of the present disclosure.

FIG. 4 depicts a flow diagram of an example method 400 for computing the example universal polynomial hash function in a manner resistant to external monitoring attacks, by masking the first input data block, and re-using the corresponding mask correction value as the mask in the subsequent iterations, in accordance with one or more aspects of the present disclosure. Method 400 and/or each of its individual functions, routines, subroutines, or operations may be performed by one or more general purpose and/or specialized processing devices. Two or more functions, routines, subroutines, or operations of method 400 may be performed in parallel or in an order that may differ from the order described above. In certain implementations, method 400 may be performed by a single processing thread. Alternatively, method 400 may be performed by two or more processing threads, each thread executing one or more individual functions, routines, subroutines, or operations of the method. In an illustrative example, the processing threads implementing method 400 may be synchronized (e.g., using semaphores, critical sections, and/or other thread synchronization mechanisms). Alternatively, the processing threads implementing method 400 may be executed asynchronously with respect to each other. In an illustrative example, method 400 may be performed by the circuit 200 described herein above with references to FIG. 2. In another illustrative example, method 400 may be performed by the computing system 1000 described herein below with references to FIG. 7. In yet another illustrative example, method 400 may be performed by the computing system 1000 of FIG. 7 that is equipped with a cryptographic hardware accelerator implementing the structure and functions of the circuit 200 of FIG. 2.

Referring to FIG. 4, at block 410, a processing device implementing the method may apply a mask value to the first input data block to initialize the masked iteration result value:

$$X'_1 = ((X_0 \oplus M)C_1)*H.$$

The first input data block may include a block of the ciphertext or a block of AAD.

At block 420, the processing device may multiply the mask value to the hash key value to initialize the mask correction value: $MC_1 = M*H$, as described in more detail herein above. The multiplication operation is performed in the finite field, for example in $GF(2^{128})$ field.

Blocks 430-460 describe the operations that are iteratively performed on each incoming data block, starting from the second one. Each input data block may include a block of the ciphertext or a block of AAD.

At block 430, the processing device may receive the i-th input data block $C_i$.

At block 440, the processing device may multiply a hash key by a combination of the input data block and the masked result value of the previous iteration to produce the new masked result value, which is then be fed back to the input of the next iteration: $X'_i = (X'_{i-1} \oplus C_i)*H$, as described in more detail herein above. The multiplication operation is performed in the finite field, for example, in $GF(2^{128})$ field for the GHASH function. The combination of the input data block and the masked result value herein refers to the exclusive disjunction of the input data block and the masked result value.

At block 450, the processing device may multiply the hash key by the mask correction value of the previous iteration to produce the new mask correction value, which is then be fed back to the input of the next iteration: $MC_i = H*MC_{i-1}$, as described in more detail herein above.

As noted herein above, depending upon the number of available hardware multiplier circuits, operations of blocks 440 and 450 may be performed simultaneously, sequentially, or in an interleaved manner with respect to each other.

Responsive to determining, at block 460, that the current input data block is the last one, the operations may continue at block 470; otherwise, the method may loop back to block 430.

At block 470, the processing device may produce the unmasked result value by applying the mask correction value to the masked result value: $X_k = X'k \oplus (M*H^k)$, where k denotes the number of iterations, as described in more detail herein above. The unmasked result value represents the value of the computed universal polynomial hash function, for example, the GHASH function. Responsive to completing operations of block 470, the method may terminate.

Figure 5:
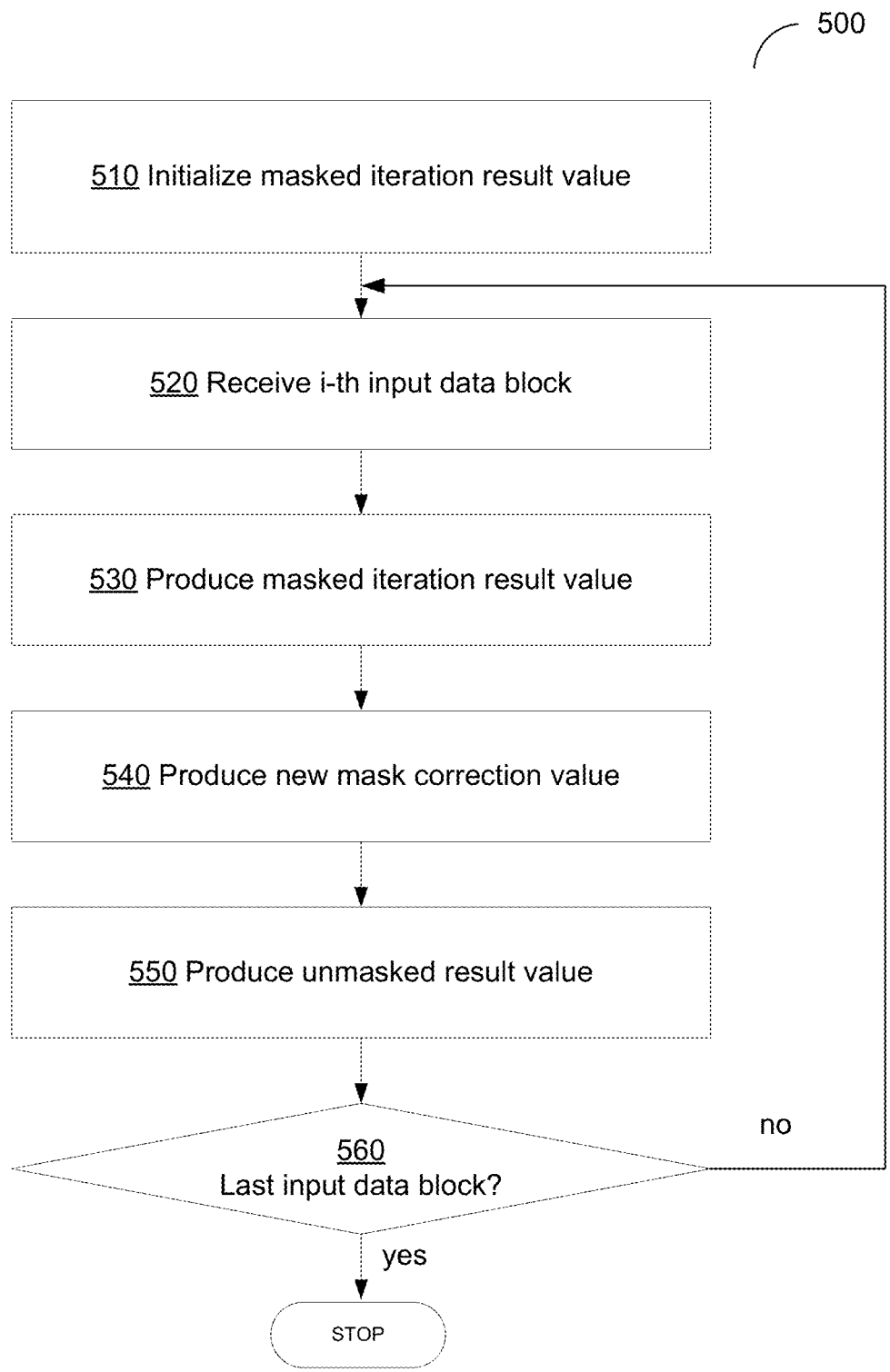
FIG. 5 depicts a flow diagram of an example method for computing the example hash function in a manner resistant to external monitoring attacks, by masking the hash key, in accordance with one or more aspects of the present disclosure.

FIG. 5 depicts a flow diagram of an example method 500 for computing the example hash function in a manner resistant to external monitoring attacks, by masking the hash key, in accordance with one or more aspects of the present disclosure. Method 500 and/or each of its individual functions, routines, subroutines, or operations may be performed by one or more general purpose and/or specialized processing devices. Two or more functions, routines, subroutines, or operations of method 500 may be performed in parallel or in an order that may differ from the order described above. In certain implementations, method 500 may be performed by a single processing thread. Alternatively, method 500 may be performed by two or more processing threads, each thread executing one or more individual functions, routines, subroutines, or operations of the method. In an illustrative example, the processing threads implementing method 500 may be synchronized (e.g., using semaphores, critical sections, and/or other thread synchronization mechanisms). Alternatively, the processing threads implementing method 500 may be executed asynchronously with respect to each other. In an illustrative example, method 500 may be performed by the circuit 300 described herein above with references to FIG. 3. In another illustrative example, method 500 may be performed by the computing system 1000 described herein below with references to FIG. 7. In yet another illustrative example, method 500 may be performed by the computing system 1000 of FIG. 7 that is equipped with a cryptographic hardware accelerator implementing the structure and functions of the circuit 300 of FIG. 3.

Referring to FIG. 5, at block 510, a processing device implementing the method may apply the masked hash key value to the first input data block to initialize the masked iteration result value: $X'_i = (X_0 \oplus C_i)*(H \oplus M)$, where $X_0$ is the initialization for computing a universal polynomial hash function; for example, $X_0 = 0^{128}$ for GHASH function. The masked hash key may be provided by the exclusive disjunction of the mask value and the hash key value, as described in more detail herein above. The method may further apply the mask value to the first input data block to initialize the mask correction value: $MC_1 = (C_1 \oplus X_0)*M$.

The first input data block may include a block of the ciphertext or a block of AAD.

Blocks 520-560 describe the operations that are iteratively performed on each incoming data block, starting from the second one. Each input data block may include a block of the ciphertext or a block of AAD.

At block 520, the processing device may receive the i-th input data block $C_i$.

At block 530, the processing device may multiplying the masked hash key by a combination of the received input data block and the unmasked iteration result value to produce a masked iteration result value: $X'_i = (X_{i-1} \oplus C_i)*(H \oplus M)$, as described in more detail herein above. The multiplication operation is performed in the finite field, for example, in the $GF(2^{128})$ field in case of the GHASH function. The combination of the input data block and the unmasked iteration result value herein refers to the exclusive disjunction of the received input data block and the unmasked iteration result value.

At block 540, the processing device may multiply the mask value by a combination of the input data block and the unmasked previous iteration result value to produce a mask correction value: $MC_i = (X_{i-1} \oplus C_i)*M$, as described in more detail herein above.

At block 550, the processing device may produce the new unmasked iteration result value by applying the mask correction value $MC_i$ to the masked current iteration result value:

$$X_i = ((X_{i-1} \oplus C_i)*(H \oplus M)) \oplus ((X_{i-1} \oplus C_i)*M),$$ as described in more detail herein above.

Responsive to determining, at block 560, that the current input data block is the last one, the method may terminate; otherwise, the method may loop back to block 520. The unmasked result value represents the value of a universal polynomial hash function, such as GHASH function.

Figure 6:
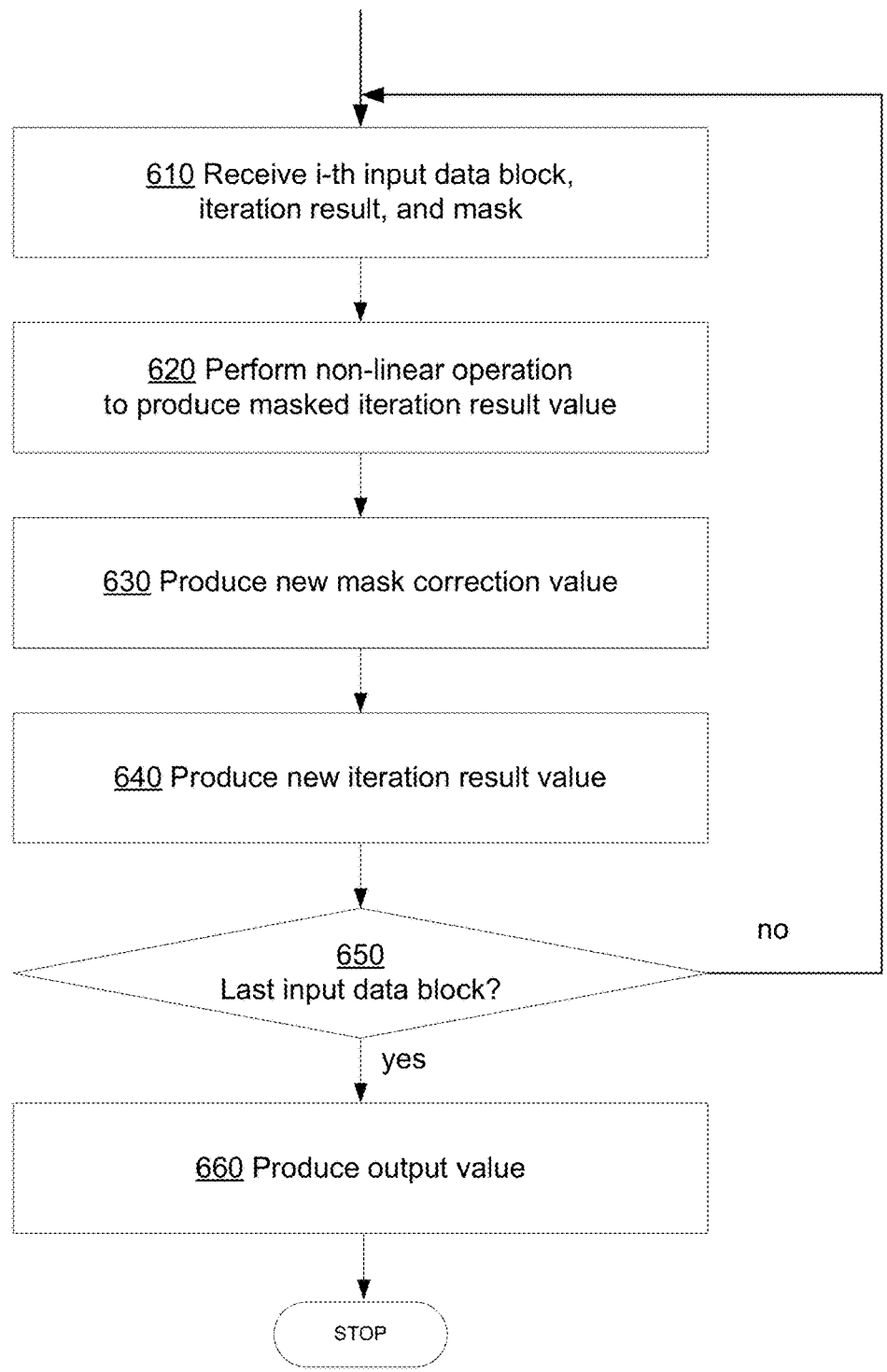
FIG. 6 depicts a flow diagram of a generalized example method 600 for computing the example hash function in a manner resistant to external monitoring attacks, by masking either the input data block or the hash key, in accordance with one or more aspects of the present disclosure.

FIG. 6 depicts a flow diagram of a generalized example method 600 for computing the example hash function in a manner resistant to external monitoring attacks, by masking either the input data block or the secret hash key, in accordance with one or more aspects of the present disclosure. The example method 600 computes a universal polynomial hash function by iterating over a certain number of blocks of input data, such that the partial result of the iterative computations on all the previous blocks of input data is being combined with the new input block of data and then processed again by a non-linear operation, such as a multiplication with the secret hash key. Thus, a non-linear operation, such as field multiplication, receives as one of its operands the result of the previous iteration combined with a new data, and as a second operand the secret hash key. In order to prevent side-channel leakage during execution of the non-linear operation, the processed data is randomized (e.g., masked). The method 600 is based on randomization of only one of the operands, and carrying the mask correction value (which depends on the initial random mask value) as a new random mask for a new iteration.

Method 600 and/or each of its individual functions, routines, subroutines, or operations may be performed by one or more general purpose and/or specialized processing devices. Two or more functions, routines, subroutines, or operations of method 600 may be performed in parallel or in an order that may differ from the order described above. In certain implementations, method 600 may be performed by a single processing thread. Alternatively, method 600 may be performed by two or more processing threads, each thread executing one or more individual functions, routines, subroutines, or operations of the method. In an illustrative example, the processing threads implementing method 600 may be synchronized (e.g., using semaphores, critical sections, and/or other thread synchronization mechanisms). Alternatively, the processing threads implementing method 600 may be executed asynchronously with respect to each other. In an illustrative example, method 600 may be performed by the circuit 200 described herein above with references to FIG. 2. In another illustrative example, method 600 may be performed by the circuit 300 described herein above with references to FIG. 3. In yet another illustrative example, method 600 may be performed by the computing system 1000 described herein below with references to FIG. 7. In yet another illustrative example, method 600 may be performed by the computing system 1000 of FIG. 7 that is equipped with a cryptographic hardware accelerator implementing the structure and functions of the circuit 200 of FIG. 2 and/or the circuit 300 of FIG. 3.

Referring to FIG. 6, at block 610, a processing device implementing the method may receive an input data block, an iteration result value, and a mask value, as described in more detail herein above.

At block 620, the processing device may perform a non-linear operation to produce a masked result value. The first operand of the non-linear operation may be represented by a combination of the iteration result value and the input data block, and the second operand of the non-linear operation may be represented by a secret hash value. In order to protect the implementation from side-channel attacks, one of the first operand or the second operand is masked using a mask value. The non-linear operation is represented by a field multiplication operation, as described in more detail herein above.

At block 630, the processing device may determine, based on the mask value, a mask correction value, as described in more detail herein above.

At block 640, the processing device may produce a new iteration result value by applying the mask correction value to the masked result value, as described in block 550 of FIG. 5 or by leaving the result of the iteration masked, according to the FIG. 4.

Responsive to determining, at block 650, that the current input data block is the last one, the method may produce the output value at block 660; otherwise, the method may loop back to block 610. The output value may be produced by removing the mask correction value, as described by block 470 of FIG. 4, or by outputting the unmasked result of the last iteration, as described by FIG. 5. The unmasked result value represents the value of a universal polynomial hash function, such as GHASH function. The polynomial hash function value may be utilized in performing authenticated encryption and/or decryption operations.

Figure 7:
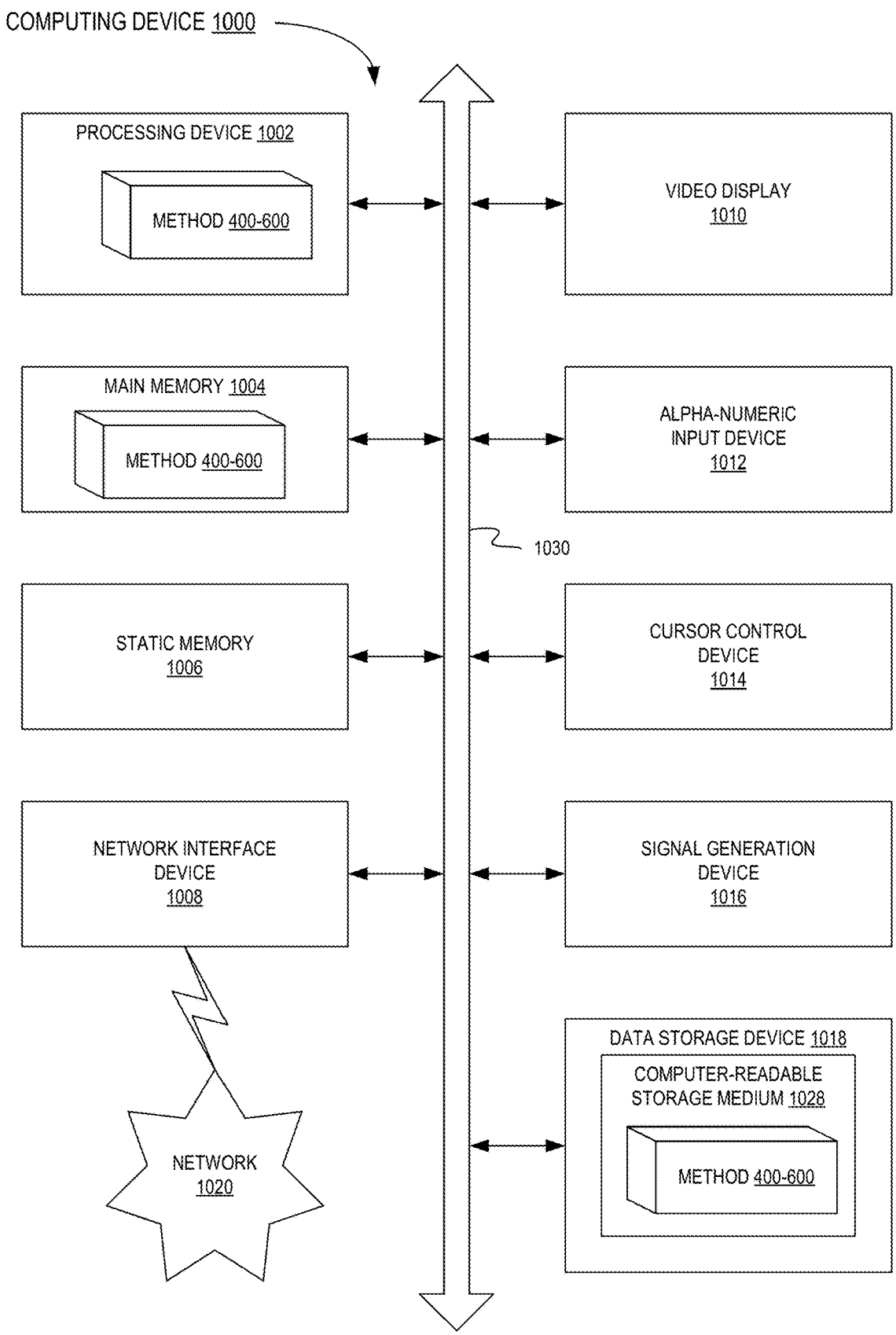
FIG. 7 illustrates a diagrammatic representation of an example computing system within which a set of instructions, for causing the computing device to perform the methods described herein, may be executed.

FIG. 7 illustrates a diagrammatic representation of a computing system 1000 which may incorporate the processing device described herein and within which a set of instructions, for causing the computing device to perform the methods described herein, may be executed. Computing system 1000 may be connected to other computing devices in a LAN, an intranet, an extranet, and/or the Internet. The computing device may operate in the capacity of a server machine in client-server network environment. The computing device may be provided by a personal computer (PC), a set-top box (STB), a server, a network router, switch or bridge, or any machine capable of executing a set of instructions (sequential or otherwise) that specify actions to be taken by that machine. Further, while only a single computing device is illustrated, the term "computing device" shall also be taken to include any collection of computing devices that individually or jointly execute a set (or multiple sets) of instructions to perform the methods described herein.

The example computing system 1000 may include a processing device 1002, which in various illustrative examples may be a general purpose or specialized processor comprising one or more processing cores. The example computing system 1000 may further comprise a main memory 1004 (e.g., synchronous dynamic random access memory (DRAM), read-only memory (ROM)), a static memory 1006 (e.g., flash memory and a data storage device 1018), which may communicate with each other via a bus 1030.

The processing device 1002 may be configured to execute methods 400, 500 and/or 600 for computing the example hash function in a manner resistant to external monitoring attacks, in accordance with one or more aspects of the present disclosure for performing the operations and steps described herein.

The example computing system 1000 may further include a network interface device 1008 which may communicate with a network 1020. The example computing system 1000 also may include a video display unit 1010 (e.g., a liquid crystal display (LCD) or a cathode ray tube (CRT)), an alphanumeric input device 1012 (e.g., a keyboard), a cursor control device 1014 (e.g., a mouse) and an acoustic signal generation device 1016 (e.g., a speaker). In one embodiment, the video display unit 1010, the alphanumeric input device 1012, and the cursor control device 1014 may be combined into a single component or device (e.g., an LCD touch screen).

The data storage device 1018 may include a computer-readable storage medium 1028 on which may be stored one or more sets of instructions (e.g., instructions of methods 400, 500, and/or 600 for computing polynomial hash functions in a manner resistant to external monitoring attacks, in accordance with one or more aspects of the present disclosure) implementing any one or more of the methods or functions described herein. Instructions implementing methods 400, 500, and/or 600 may also reside, completely or at least partially, within the main memory 1004 and/or within the processing device 1002 during execution thereof by the example computing system 1000, hence the main memory 1004 and the processing device 1002 may also constitute or comprise computer-readable media. The instructions may further be transmitted or received over the network 1020 via the network interface device 1008.

While the computer-readable storage medium 1028 is shown in an illustrative example to be a single medium, the term "computer-readable storage medium" should be taken to include a single medium or multiple media (e.g., a centralized or distributed database and/or associated caches and servers) that store the one or more sets of instructions. The term "computer-readable storage medium" shall also be taken to include any medium that is capable of storing, encoding or carrying a set of instructions for execution by the machine and that cause the machine to perform the methods described herein. The term "computer-readable storage medium" shall accordingly be taken to include, but not be limited to, solid-state memories, optical media and magnetic media.

Unless specifically stated otherwise, terms such as "updating", "identifying", "determining", "sending", "assigning", or the like, refer to actions and processes performed or implemented by computing devices that manipulates and transforms data represented as physical (electronic) quantities within the computing device's registers and memories into other data similarly represented as physical quantities within the computing device memories or registers or other such information storage, transmission or display devices. Also, the terms "first," "second," "third," "fourth," etc. as used herein are meant as labels to distinguish among different elements and may not necessarily have an ordinal meaning according to their numerical designation.

Examples described herein also relate to an apparatus for performing the methods described herein. This apparatus may be specially constructed for the required purposes, or it may comprise a general purpose computing device selectively programmed by a computer program stored in the computing device. Such a computer program may be stored in a computer-readable non-transitory storage medium.

The methods and illustrative examples described herein are not inherently related to any particular computer or other apparatus. Various general purpose systems may be used in accordance with the teachings described herein, or it may prove convenient to construct more specialized apparatus to perform the required method steps. The required structure for a variety of these systems will appear as set forth in the description above.

The above description is intended to be illustrative, and not restrictive. Although the present disclosure has been described with references to specific illustrative examples, it will be recognized that the present disclosure is not limited to the examples described. The scope of the disclosure should be determined with reference to the following claims, along with the full scope of equivalents to which the claims are entitled.

What is claimed is:

1. A method for performing a cryptographic operation, the method comprising:
   receiving, by a processing device, an input data block and an unmasked result value;
   multiplying a mask value by a combination of the input data block and the unmasked result value to produce a mask correction value;
   multiplying a masked hash key by the combination of the input data block and the unmasked result value to produce a masked result value;
   determining a new unmasked result value by applying the mask correction value to the masked result value; and
   protecting the cryptographic operation from external monitoring attacks by utilizing the new unmasked result value as a value of a polynomial hash function in the cryptographic operation.

2. The method of claim 1, wherein the cryptographic operation is represented by one of: an authenticated encryption operation or an authenticated decryption operation.

3. The method of claim 1, wherein the receiving, multiplying, and determining operations are performed iteratively, such that the new unmasked result value produced by a current is supplied to a next iteration as the unmasked result value.

4. The method of claim 1, wherein the masked hash key is provided by a combination of the mask value and a hash key.

5. The method of claim 1, further comprising:
   applying the masked hash key value to a first input data block to initialize the unmasked result value.

6. The method of claim 1, wherein the combination of the input data block and the unmasked result value is represented by exclusive disjunction of the input data block and the unmasked result value.

7. The method of claim 1, wherein the multiplying operations are performed in a finite field.

8. The method of claim 1, wherein the input data block comprises at least one of: a ciphertext block or an additional authentication data (AAD) block.

9. A system for performing a cryptographic operation, the system comprising:
   a first multiplier circuit to multiply a mask value by a combination of an input data block and an unmasked result value to produce a mask correction value; and
   a second multiplier circuit to multiply a masked hash key by the combination of the input data block and the unmasked result value to produce a masked result value; and
   an adder circuit to produce a new unmasked result value by applying the mask correction value to the masked result value, wherein the new unmasked result value is utilized, as a value of a polynomial hash function, for protecting the cryptographic operation from external monitoring attacks.

10. The system of claim 9, further comprising a second adder to combine the input data block and the masked result value.

11. The system of claim 9, wherein the first multiplier circuit performs multiplication operations a finite field.

12. The system of claim 9, wherein the first multiplier circuit and the second multiplier circuit are provided by a same multiplier circuit.

13. The system of claim 9, wherein the second multiplier circuit performs multiplication operations a finite field.

14. The system of claim 9, further comprising a first adder circuit to perform a bitwise exclusive disjunction operation.

15. The system of claim 9, wherein the mask correction value is produced by a selector circuit producing a mask value at a first iteration and an output of the second multiplier circuit at subsequent iterations.

16. The system of claim 9, wherein the cryptographic operation is represented by one of: an authenticated encryption operation or an authenticated decryption operation.

17. The system of claim 9, wherein the masked hash key is provided by a combination of the mask value and a hash key.

18. The system of claim 9, wherein the input data block comprises a ciphertext block.

19. The system of claim 9, wherein the input data block comprises an additional authentication data (AAD) block.

20. A system for performing a cryptographic operation, the system comprising:
   a memory; and
   a processing device coupled to the memory, wherein the processing device is configured to:
      receive an input data block and an unmasked result value;
      multiply a mask value by a combination of the input data block and the unmasked result value to produce a mask correction value;
      multiply a masked hash key by a combination of the input data block and the unmasked result value to produce a masked result value;
      determine a new unmasked result value by applying the mask correction value to the masked result value; and
      utilize the new unmasked result value as a value of a polynomial hash function for protecting the cryptographic operation performed from external monitoring attacks.

* * * * *